March 27, 1951  F. J. MARTINI  2,546,465
SPINNING TYPE FISHING REEL
Filed Sept. 20, 1948  3 Sheets-Sheet 1
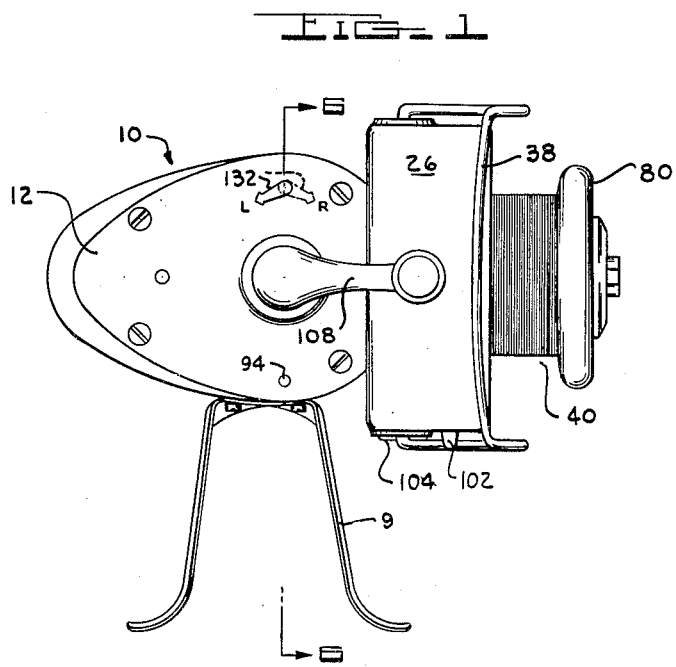
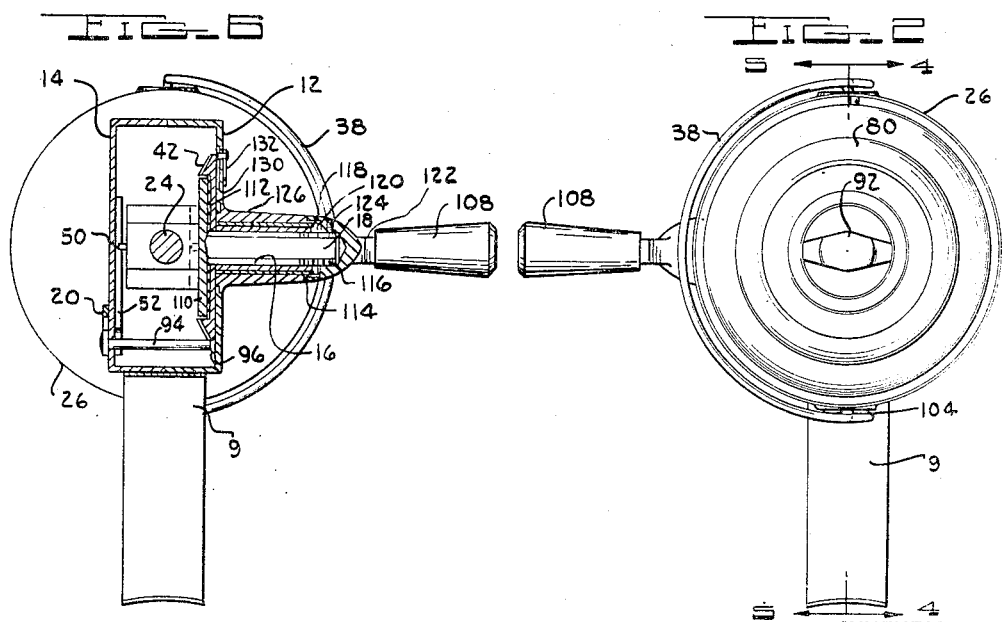
INVENTOR.
FRANZ J. MARTINI
BY Arthur M. Smith
ATTORNEY March 27, 1951
F. J. MARTINI
2,546,465
SPINNING TYPE FISHING REEL
Filed Sept. 20, 1948
3 Sheets-Sheet 2
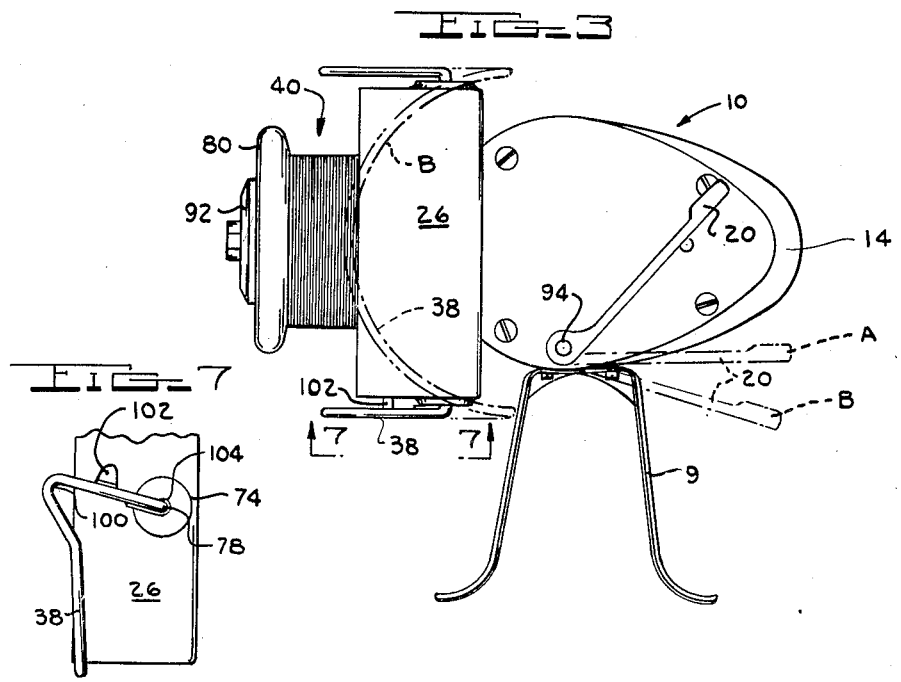
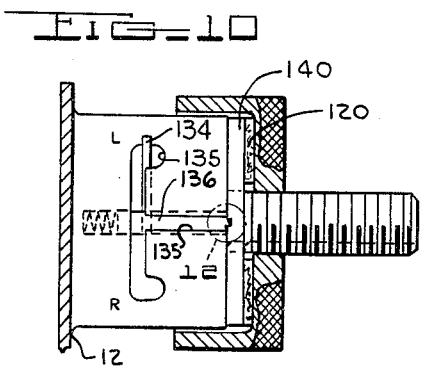
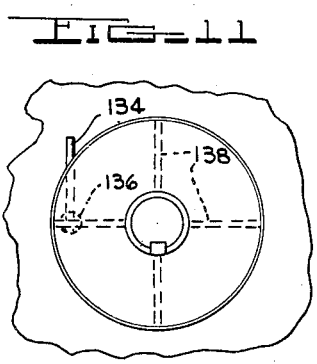
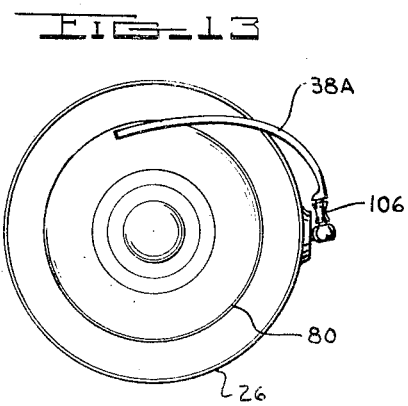
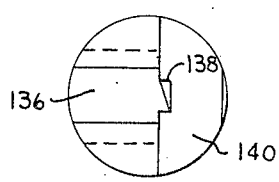
INVENTOR.
FRANZ J. MARTINI
BY
Arthur M. Smith
ATTORNEY

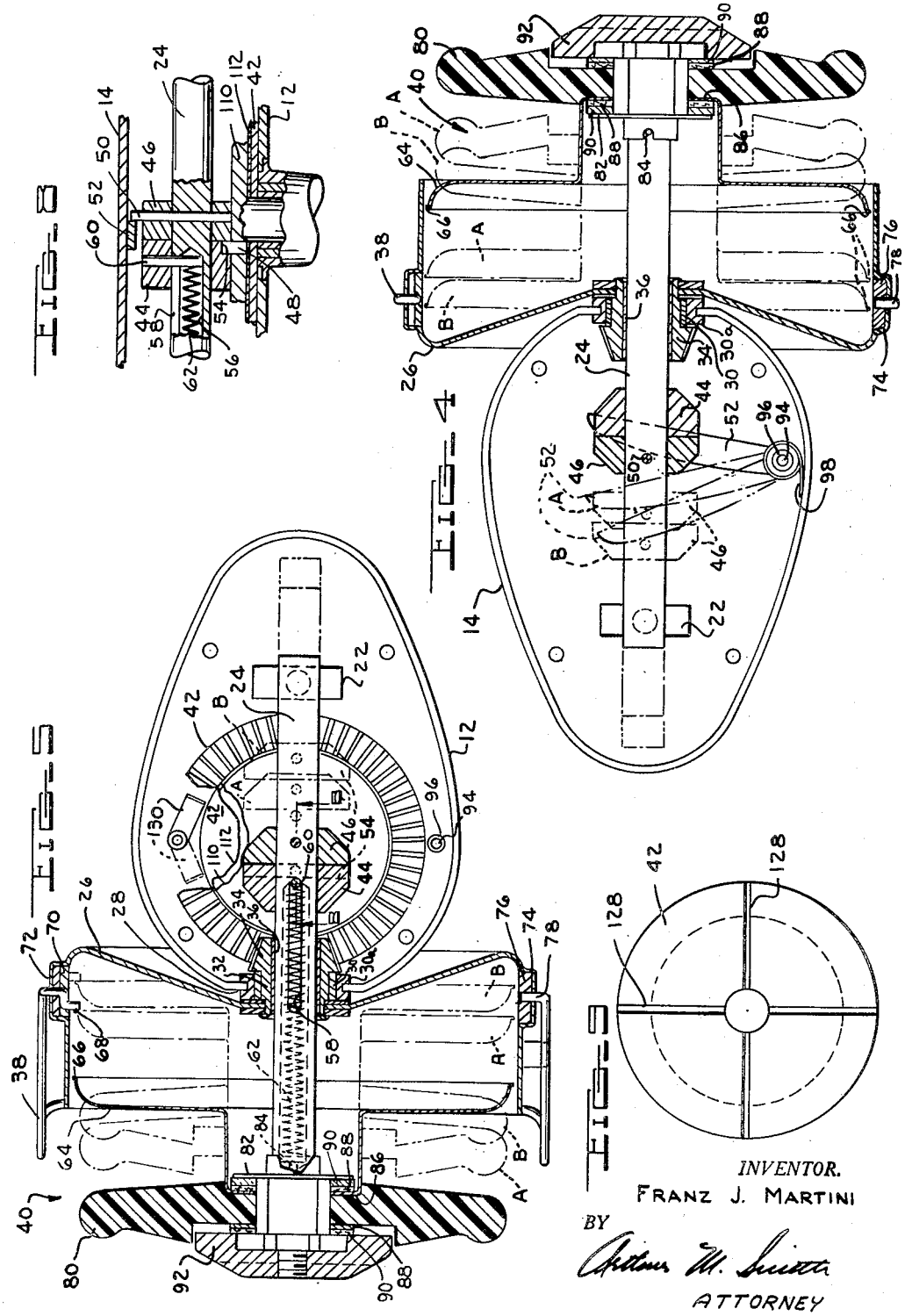

Patented Mar. 27, 1951

2,546,465

UNITED STATES PATENT OFFICE 2,546,465

SPINNING TYPE FISHING REEL

Franz J. Martini, Ferndale, Mich.

Application September 20, 1948, Serial No. 50,200

19 Claims. (Cl. 242—84.4)

The present invention relates to a spinning type fishing reel wherein a spool is mounted on a reciprocating shaft and a cup carrying the line winding member rotates about the spool to wind the line around the spool during its reciprocation.

Fishing reels of the general type known as "spinning reels" are disclosed in prior United States Letters Patent No. 1,187,840, issued June 20, 1916; No. 2,229,470, issued January 21, 1941; and No. 2,344,209, issued March 14, 1944.

The term "spinning reel" is applied to reels of the type which are adapted for casting a line and lure by spinning the line from the end of a line holding spool which is stationary during the line casting operation. In such a reel, as distinguished from conventional types of fishing reels, the spool is stationary both during the cast as well as during the retrieving of the line and lure. In some instances, provision is made for a limited amount of rotary movement of the spool relative to the spindle when the load on the line exceeds a predetermined adjusted amount during the retrieving movement.

In reels of the spinning type, the line is wound on the spool by the rotation of a cup-shaped flier which surrounds the spool and rotates a line winding member around the spool. In casting, the line winding member is moved out of contact with the line and the line is released from the reel by stripping it over the end flange of the stationary spool. During stripping, the line is whirled or spun about an axis which is generally coincident with the axis of the stationary spool. Due to the centrifugal forces acting on the line, the orbit described by the spinning line is larger than the circumference of the end flange of the stationary spool. In reels of the spinning type, resistance to the release of the line and flight of the lure is very low, thus permitting relatively longer casts than is possible under the same conditions with conventional types of reels in which the line spool rotates. Since there are no rotating parts set in motion by the line during the cast, backlashes and tangles in the line are reduced so that the spinning type reel permits a more perfect control over the line and lure at all times than is possible with conventional types of rotating spool reels.

As distinguished from the spinning reels shown in the above identified prior patents, the present invention provides a spinning reel in which the spool may be retracted into the cup-shaped flier at any time by manual means readily controlled by the user and in which movement of the spool into its retracted position automatically withdraws the line winding member from line engaging contact. The reel of the present invention also provides a number of mechanical improvements on reels of the types shown in the foregoing patents, particularly as regards the adjustable clutch or drag mechanism, the adjustment to permit right or left hand operation of the crank, as well as improvements in the general construction and assembly of the parts.

It is therefore, a principal object of the present invention to provide a spinning type fishing reel whose simplicity of design and assembly makes it suitable for volume production at a relatively low cost.

A further object of the present invention is to provide a spinning type fishing reel of improved design in which the line carrying spool may be retracted by the user into line casting position in the flier at any time and the line engaging member is automatically disengaged from line contact when the spool moves into its retracted line casting position.

It is a further object of the present invention to provide a spinning type fishing reel in which the body housing is formed of lightweight complemental sections which may be formed either by stamping or die casting and which provides for the ready assembly of the parts of the completed reel.

It is a further object of the present invention to provide a spinning type fishing reel in which the line carrying spool is mounted on a reciprocating spindle and held against rotation thereon and in which an adjustable clutch member is interposed between the reel operating crank and the spindle and flier drive mechanism.

It is a further object of the present invention to provide a spinning type fishing reel in which the drive connection between the operating crank and the reel operating drive mechanism may be readily reversed to permit either right or left hand operation of the operating crank.

Other objects of the present invention will appear in the following description and appended claims, reference being had to the accompanying drawings, which form a part of this specification, wherein like reference characters designate corresponding parts of the several views.

In the drawings:

Fig. 1 is a side elevation of a spinning type fishing reel embodying the present invention.

Fig. 2 is a front elevation of the reel shown in Fig. 1.

Fig. 3 is a side elevation taken from the opposite side of the reel not shown in Fig. 1 and showing in solid lines the line-winding member in its line engaging operating position and showing in phantom line said member withdrawn to its line casting position.

Figs. 4 and 5 are sectional views taken substantially along the lines 4—4 and 5—5 respectively of Fig. 2 in the direction of the arrows and showing the parts in solid lines in their line winding position and showing in phantom lines the respective positions taken by the parts during the line casting operation.

Fig. 6 is a section taken substantially along the line 6—6 in the direction of the arrows, Fig. 1.

Fig. 7 is a partial view of the line winding bail taken substantially on the line 7—7 in the direction of the arrows, Fig. 3.

Fig. 8 is a section taken substantially along the line 8—8 in the direction of the arrows, Fig. 5.

Fig. 9 is a rear elevation of the ring gear shown in Fig. 5.

Fig. 10 is an enlarged view partially broken away and partially in section and showing a modified form of reverse stop mechanism.

Fig. 11 is a front elevation of the reverse stop mechanism shown in Fig. 10.

Fig. 12 is an enlarged view of the circled portion numbered 12 in Fig. 10.

Fig. 13 is a front elevation of a spinning type fishing reel embodying the present invention and showing a modified form of line winding member.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the numeral 10 indicates the housing which is formed of two complemental light weight metal stampings or die castings each forming one-half of the completed housing. The right half 12 carries a bushing 16 which acts as a journal for the handle crank shaft 18. The left half 14 of the housing carries the spool retracting lever 20. Inside the housing, inserts 22 are provided which act as a pilot bearing for the reciprocating main shaft 24 and support the said shaft for reciprocal movement and the cup-shaped flier 26 for rotation. The inserts 22 are self-aligning and preferably are formed of a self-lubricating bearing material. A semi-circular opening 28 is provided in the forward portion of each of the complemental members forming the housing 10 and engage the fixed bearing sleeve 30a carrying the bearing 30 in which the rotatable flier 26 is mounted. The bearing 30 and bearing sleeve 30a align the flier 26 and its shaft 32 in the housing. The hollow pinion gear 34 is permanently attached to the flier 26 and is provided with the sleeve bearing 36 which is pressed into its hub. The pinion gear 34 rotates in the bearing 30 and the main shaft 24 rotates in the sleeve bearing 36 which rotates with the pinion gear 34 to provide a rotating bushing or bearing for supporting the forward end of the shaft 24 for reciprocal movement relative to the housing.

Reciprocation of the spool 40 is accomplished simultaneously with the rotation of the flier 26. The rotating line winding member 38 thus feeds line to the reciprocating spool 40 which distributes the line uniformly over the length of the spool.

A main drive gear 42 is meshed with the pinion gear 34 which carries the flier 26 and in which the main shaft 24 is mounted. The main drive gear 42 is rotatably mounted in the housing 10 and is provided with a driving connection with the handle crank shaft 18.

A split bushing is mounted on the shaft 24 and has a forward half 44 which is slotted to receive a pin 48 which is carried by the main drive gear 42. The rearward half 46 of the split bushing carries a pin 50 which extends through the main shaft 24 and upward to a point of engagement by the spool retracting arm 52.

Upon rotation of the handle crank shaft 18, the main drive gear 42 is rotated and the pin 48 moves in the slot 54 thus causing the shaft 24 to reciprocate longitudinally of the housing. At the same time, the gear 34 is rotated and the flier 26 and the line engaging member 38 are rotated relative to the shaft 24. The main shaft 24 is hollow as at 56 and is slotted as at 58 to receive a pin 60 which holds the bushing half 44 against the bushing half 46. A spring 62 is mounted inside the hollow portion 56 of said shaft and bears against the pin 60. It is to be noted that this construction of the split bushing permits the retraction of the spool 40 into the flier 26 regardless of the extended position of the spool relative to the flier. This feature is very desirable because it permits the retraction of the spool for making a cast without regard to the extended position of the spool 40 at the time.

The spool 40 is readily interchangeable and may be removed easily from the spindle by loosening the screw-threaded nut on the end of the spool shaft. This is desirable to permit a ready change of the lines, as for example when wet and dry lines are being used with wet or dry flies. Such a ready change of spools and lines permits the use of the proper lines at all times.

The spool 40 is preferably composed of a stamped or spun flanged member 64, having a peripheral flange 66. The flange 66 is adapted to engage an eccentric cam 68 provided on the line winding member 38. The eccentric cam 68 is mounted in the bearing 70 which is held by a boss 72 on the flier 26. The opposite side of the flier 26 carries a boss 74 and bearing 76 in which the other end 78 of the line winding member 38 is centered. The other part of the spool 40 is a plastic disc 80 having a radius at its periphery to prevent the line from becoming entangled with the spool and having a recessed seat 86. The spool 40 is held in position against a flanged member 82 which is pinned to the shaft 24. The pin 84 provides a seat for a spring 62 which holds the flange 82 in position. Interposed between the flanged member 82 and the inside of the hub of the flanged member 64 is a felt washer 88 and a fiber washer 90. A similar set of felt and fiber washers is interposed between the plastic disc 80 and the clamping member 92.

When the spool 40 is to be drawn into the flier 26, the spool retracting member 20 is depressed and rotates the shaft 94 which is journaled in the bearing 96 in the housing 12. The shaft 94 has an arm 52 fixed to it which engages a pin 50. When the spool retracting lever 20 is depressed to the position A shown in the phantom line, the spool 40 and the bushing 46 assume the phantom line position A while the line engaging member 38 remains in the same line engaging position. When the lever 20 is further depressed to the phantom line position B, the cam 68 is engaged by the flange 66 on the spool 40 and the line winding member 38 is moved into phantom line position B (Fig. 3) and the bushing 46 is moved into phantom position B (Figs. 4 and 5). A torsion spring 98 holds the arm 52 in its normal raised position.

The line winding member 38 is preferably made of Monel metal or other non-corrosive material and is provided with an insert of a wear resisting metal alloy such as for example tungsten carbide or the like at the point 100 where the line engages the angle of the line winding member 38. A stop 102 is provided on the flier 26 along with a torsion spring 104 to return the line engaging member to the normal line engaging position when the spool retracting lever 20 is released.

Although the line engaging member 38 as shown in the preferred form of the invention is in the form of a continuous bail secured at each end to the flier 26, a modified form thereof such as that shown in Fig. 13 also may be used. As here shown, the member 38A may be of the pivoted finger type and may carry a line roller 106 which eliminates friction between the line and the finger member and eliminates wear on the finger member. The member 38A is pivotally mounted and is actuated in the same manner as is the continuous member previously described.

A clutch or drag mechanism is provided to permit the line to play out while the crank 108 is being turned to reel in the line. This is accomplished preferably by the use of a friction plate 110 disposed adjacent the main driving gear 42 and separated therefrom by a fibre friction disc 112. A spacer bushing 114 slightly longer than the bearing 16 extends around the bearing 16 through which the crank operating shaft 18 extends and to which the friction plate 110 is attached for the purpose of permitting an adjusted amount of friction or drag on the line. By turning the crank 108 on the threads 116 provided on the crank drive shaft 18 a pressure is exerted on the felt washer 118 and the fibre washer 120 which in turn is transferred to the hub 122 of the crank. This permits a close adjustment of the amount of friction and permits pulling the friction plate into close contact with the driving gear 42. When the proper drag has been selected, the setscrew 124 on the handle 108 is turned down and locked in place.

This type of construction is desirable in that the spool is held against rotation at all times and eliminates the frequent cause of backlash which results from a twist in the line due to the rotation of the spool. A journal bearing 126 surrounds a spacer 114, is secured to the housing 12 and held thereto by any suitable means.

A preferred form of reverse stop mechanism shown in the drawings comprises a plurality of slots 128 which are placed on the back of the main gear 42 (see Fig. 9). The slots 128 are engaged by the ends of a phosphor bronze flat spring dog 130 which is riveted to an indicator arm 132 in the housing 12. By movement of the indicator arm 132, the ends of the spring dog 130 are positioned relative to the slots 128 to drive the gear 42 in one direction. By reverse movement of the arm 132, the ends of the spring dog 130 are brought into position to permit driving of the gear 42 in the opposite direction.

By this means, the direction of the rotation of the reel may be selectively controlled to permit either right or left hand actuation of the operating crank.

A modified form of the reverse stop mechanism is shown in Fig. 10. As here shown, a pin 134 is locked in a bayonet lock cam slot 135 and operates a toothed plunger 136 which engages with serrations 138 on the drive means 140. By reversing the pin 134, the tooth on the plunger 136 will stop the turning of the drive means 140 in a reverse direction. By using this construction, the reel may be used for either right or left hand operation.

The ready adjustment of the reverse stop mechanism is very advantageous in a reel of this type as in some uses the reel may be mounted on the top side of the rod handle while in other uses it may be desirable to mount the reel on the bottom side of a rod handle. This permits the operation of the reel crank handle with either the right or the left hand as desired by the user.

The fishing reel embodying the present invention is provided with a suitable support 9 having opposed arms and a top portion which is attached to the housing 10. The extending end portions of the support 9 are adapted for attachment to any desired conventional attaching members provided on a reel seat located adjacent the handle of a fishing rod. The ends of the support 9 are held in the reel seat by any desired type of detachable securing device ordinarily employed in conventional constructions with rods of the type with which the present reel is to be used.

The nature of a spinning reel is such that it is desirable to suspend the working parts of the reel a sufficient distance from the body portion of the fishing rod so that a sufficient clearance is provided to permit the operation of the flier 26 and the line guiding members 38 or 38A and so that the rod will not interfere with the whirling or spinning motion of the line as it is stripped from the front end of the spool 40 when executing a cast.

In use, the reel is attached in any desired manner to a fishing rod at or relatively near the butt of the rod. The axis of the reel is disposed in parallel relation to the axis of the rod with the front or spool end extending generally toward the rod tip. In this position the line is free to move freely from the end of the reel spool and to pass through the conventional rod guide when executing a cast.

Before making a cast, the line spool 40 is drawn into the flier 26 by actuation of the spool retracting lever 20 and contacts the cam 68 which moves the line contacting member 38 away from the line. This permits the line to be stripped readily from the end of the spool 40 and this action will continue until the spool retracting lever 20 is released. When this occurs, the spool 40 is released from contact with the line guiding member 38, and the line guiding member 38 automatically springs into place for engagement with the line so that upon operation of the operating crank 108, the line guiding member 38 and flier 26 are rotated around the spool.

In conventional types of fishing reels, much difficulty is encountered with tangled or snarled lines due to the high speed rotation of the line holding spool which causes it to overrun the line particularly at the end of a cast. The speed of rotation of such spools is very high and despite the fact that the spools are made as light as possible, there is such an amount of inertia present in the spool as to cause the spool to continue to rotate after the cast is completed and the line and lure are at rest. This causes the line wound on the spool core to be loosened from the spool core and leads to repeated back lashes, tangles and the like which in addition to being annoying interfere seriously with the successful operation of the device.

As distinguished from such constructions, the spinning type reel of the present invention does not have any parts which rotate during the making of the cast and hence there are no inertia forces developed in the spool which will cause back lashes, tangles and the like.

From the foregoing, it will be seen that I have provided a novel construction for a spinning type fishing reel in which the line carrying spool may be readily retracted in the flier at any time in order to permit casting of the line without regard to the position of the spool prior to making the cast. The construction also provides a simplified construction and assembly of the unit and provides a construction in which all of the parts are readily aligned in the housing provided by the driving mechanism. The invention also provides a novel form of brake or drag mechanism applied to spinning types of fishing reels and also provides a construction which permits the ready use of the reel either for right or left hand operation of the crank arm and drive shaft.

I claim:

1. In a casting reel, a line carrying spool fixed to a reciprocating spindle, a rotatable cup-shaped flier surrounding said spool and having a line engaging member pivotally mounted thereon, an operating crank, driving means operatively connected with said crank, spindle, and flier to effect the simultaneous reciprocation of said spindle and rotation of said flier upon actuation of said crank, and a manually actuated lever connected with said spindle for selectively retracting said spool into said flier independently of said driving means.

2. A casting reel as claimed in claim 1 and further characterized in that said line engaging member on said flier is normally held in line engaging position by a spring associated therewith and is provided with a cam adapted to be contacted by said spool when retracted by said manually actuated lever to move said line engaging member out of line engaging position.

3. A casting reel as claimed in claim 1 and further characterized in that an adjustable friction clutch is interposed between the operating crank and the driving means to provide a brake or drag mechanism adapted to permit the line to play out during the winding action of said flier whenever the tension on said line exceeds the limits for which the friction clutch is adjusted.

4. A casting reel as claimed in claim 1 and further characterized in that an adjustable friction clutch is interposed between the operating crank and the driving means to permit reverse rotation of the flier and feeding of the line during the line winding rotation of the crank.

5. A casting reel as claimed in claim 1 and further characterized in that said line engaging member is pivotally moved out of line engaging contact by said spool when the spool is retracted into said flier by actuation of said manually actuated lever.

6. In a casting reel, a line carrying spool fixed to a reciprocating spindle, a rotatable cup-shaped flier surrounding said spool and having a line engaging member pivotally mounted thereon, an operating crank, driving means operatively connected with said crank, spindle, and flier to effect the simultaneous reciprocation of said spindle and rotation of said flier upon actuation of said crank, and a manually actuated lever connected with said spindle for selectively retracting said spool into said flier independently of said driving means, said driving means including a main drive gear, an operating crank connected therewith, a pinion gear meshed with said main drive gear and connected with said flier to effect rotation thereof upon rotation of said main drive gear, and a pin mounted off center on said main drive gear and engaged by a pin slot mounted on said spindle to effect reciprocation thereof upon rotation of said main drive gear.

7. A casting reel as claimed in claim 6 and further characterized in that said manually actuated lever contacts said spindle and exerts a pull on said spindle to disengage said driving connection and draw said spool into said flier.

8. A fishing reel as claimed in claim 6 and further characterized in that an adjustable friction clutch is interposed between said main drive gear and said operating crank.

9. In a casting reel, a line carrying spool fixed to a reciprocating spindle, a rotatable cup-shaped flier surrounding said spool and having a line engaging member pivotally mounted thereon, an operating crank, driving means operatively connected with said crank, spindle, and flier to effect the simultaneous reciprocation of said spindle and rotation of said flier upon actuation of said crank, a manually actuated lever connected with said spindle for selectively retracting said spool into said flier independently of said driving means, and a reversible drive element interposed between said operating crank and said driving means to permit the selective right or left hand operation of said crank.

10. A fishing reel as claimed in claim 9 and further characterized in that said driving means includes a main drive gear, an operating crank connected therewith, a pinion gear meshed with said main drive gear and connected with said flier to effect rotation thereof upon rotation of said main drive gear, and a pin mounted off center on said main drive gear and engaged by a pin slot mounted on said spindle to effect reciprocation thereof upon rotation of said main drive gear.

11. A casting reel as claimed in claim 9 and further characterized in that an adjustable friction clutch is interposed between said main drive gear and said operating crank.

12. A casting reel as claimed in claim 9 and further characterized in that said line engaging member on said flier is normally held in line engaging position by a spring associated therewith and is provided with a cam adapted to be contacted by said spool and retracted by said manually actuated lever to move said line engaging member out of line engaging position.

13. A casting reel as claimed in claim 9 and further characterized in that said line engaging member is pivotally moved out of line engaging contact by said spool when retracted into said flier by actuation of said manually actuated lever.

14. In a casting reel, a body housing formed of complemental half sections secured to each other, a rod attaching bracket secured to said housing, a reciprocating spindle mounted in said housing and extending from one end thereof, a line carrying spool mounted on said spindle, a cup-shaped flier surrounding said spool and mounted on said housing for rotation relative thereto, an operating shaft extending outwardly from one side of said housing, an operating crank attached to said shaft, a gear drive means connected between said operating shaft, spindle and flier to effect simultaneous reciprocation of said spindle and rotation of said flier, and a manually controlled lever mounted on said housing and connected with said spindle to effect retraction thereof.

15. A casting reel as claimed in claim 14 and further characterized in that an adjustable friction clutch is interposed between the operating crank and the driving means to permit reverse rotation of the flier and feeding of the line during the line winding rotation of the crank.

16. A casting reel as claimed in claim 14 and further characterized in that said line engaging member on said flier is normally held in line engaging position by a spring associated therewith and is provided with a cam adapted to be contacted by said spool when retracted by said manually actuated lever to move said line engaging member out of line engaging position.

17. A casting reel as claimed in claim 14 and further characterized in that an adjustable friction clutch is interposed between the operating crank and the said driving means to provide a brake or drag mechanism adapted to permit the line to play out during the winding action of the flier when the tension of said line exceeds the limits for which the friction clutch is adapted.

18. A casting reel as claimed in claim 14 and further characterized in that said driving means includes a main drive gear, an operating crank connected therewith, a pinion gear meshed with said main drive gear and connected with said flier to effect rotation thereof upon rotation of said main drive gear, and a pin mounted off center on said main drive gear and engaged by a pin slot mounted on said spindle to effect reciprocation thereof upon rotation of said main drive gear.

19. A casting reel as claimed in claim 14 and further characterized in that a reversible drive element is interposed between said operating crank and said driving means to permit selective right or lift hand operation of said crank.

FRANZ J. MARTINI.

REFERENCES CITED

The following references are of record in the file of this patent:

UNITED STATES PATENTS

| Number | Name | Date |
|---|---|---|
| 2,229,470 | Pezon | Jan. 21, 1941 |
| 2,500,445 | Worden | Mar. 14, 1950 |

FOREIGN PATENTS

| Number | Country | Date |
|---|---|---|
| 402,080 | Great Britain | Nov. 20, 1933 |